United States Patent [19]
Kwak

[11] Patent Number: 5,501,588
[45] Date of Patent: Mar. 26, 1996

[54] MOLD FOR A SEMICONDUCTOR PACKAGE

[75] Inventor: Nho K. Kwak, Incheon, Rep. of Korea

[73] Assignee: Han-Mi Mold & Tool Co., Ltd, Rep. of Korea

[21] Appl. No.: 423,165

[22] Filed: Apr. 17, 1995

[30] Foreign Application Priority Data

Apr. 22, 1994 [KR] Rep. of Korea .................. 94-8542

[51] Int. Cl.⁶ .......................... B29C 45/02; B29C 45/14
[52] U.S. Cl. ................ 425/116; 249/67; 264/272.17; 425/129.1; 425/186; 425/192 R; 425/544; 425/556; 425/444; 425/DIG. 228
[58] Field of Search .................. 425/116, 129.1, 425/121, 186, 190, 192 R, 544, 556, 444, DIG. 228, 183; 264/272.17; 249/67, 95

[56] References Cited

U.S. PATENT DOCUMENTS

| | | | |
|---|---|---|---|
| 4,723,899 | 2/1988 | Osada | 425/544 |
| 5,252,051 | 10/1993 | Miyamoto et al. | 425/116 |
| 5,358,396 | 10/1994 | Antonius Giesen | 425/544 |
| 5,366,368 | 11/1994 | Jang | 425/544 |

FOREIGN PATENT DOCUMENTS

| | | | |
|---|---|---|---|
| 60-184818 | 9/1985 | Japan | 425/544 |
| 62-206842 | 9/1987 | Japan | 425/544 |
| 4-220319 | 8/1992 | Japan | 425/DIG. 228 |

Primary Examiner—Khanh P. Nguyen
Attorney, Agent, or Firm—Willian Brinks Hofer Gilson & Lione

[57] ABSTRACT

A mold for a semiconductor package having a port for feeding resin which can be fixed either in an upper mold (1) or a bottom mold (2) corresponding to the location of the flange tip so that the operating rate of the equipment is increased to achieve high productivity.

3 Claims, 7 Drawing Sheets

MOLD FOR A SEMICONDUCTOR PACKAGE

BACKGROUND OF THE INVENTION

This invention relates to a mold for a semiconductor package and more particularly to a mold that may be used regardless of flange tip type. Consequently, the present mold can be used whether a flange tip supplies resin moving from above or below.

Generally, to manufacture a semiconductor, a mold for the semiconductor package molds resin compound on a lead frame which has been wire bonded and die bonded to protect the welding state of the lead frame and semiconductor chip.

Conventionally, a port (4) is located in the upper mold (1) and resin (3) is supplied into the port (4) and compressed with a flange tip (7) located completely out of the port as shown in FIG. 7.

A disadvantage of the prior art is that the flange tip (7) has a long stroke which reduces productivity. Furthermore, when the resin inserted into the port is compressed by the flange tip (7), since the air in the port goes through the semiconductor package together with resin, a plurality airholes is often generated and/or a wire that connects a lead and a chip of semiconductor can easily be bent.

Furthermore, since resin (3) is inserted in space which is produced by a difference of temperature between the port (4) and the flange tip (7), abrasion is caused in the portion between the port (4) and the flange tip (7) and unsatisfactory operation of mold press may be produced which reduces reliability and increase expense.

A further form of a mold has been proposed. In this mold, resin (3) is fed while a flange tip (7) reciprocates upwards so that the upper space of the flange tip (7) in the port (4) may substantially equal to the volume of resin (3). Such a mold is entirely satisfactory in reducing the generation of air-holes and bending of wire. According to the present invention, productivity of the mold is increased owing to the short stroke and since the flange tip (7) is maintained at a predetermined temperature, thus a uniform gap between the port (4) and the flange tip (7), and increased durability of the pod and the flange tip (7) are realised. Consequently, this type of mold ensures the production of a precise semiconductor package.

However, as this type of mold press designed to cooperation with a flange tip that feeds resin into the mold with downward movement goes out of use commercially, productivity is not high enough compared with the number of mold press equipment.

SUMMARY OF THE INVENTION

It is therefore an object of this invention to provide a mold for a semiconductor package in which a pod may be mounted either in an upper mold or in a bottom mold so that the mold may be adapted to various kinds mold presses regardless of their type.

According to the present invention a mold for a semiconductor package comprises a port for feeding resin; an upper center block having a runner as a feeding passage for resin and for preventing a counter current of resin; and a port fixing block that may alternatively be fixed either in an upper mold mounted in an upper portion of a mold press or a bottom mold securely fixed in a moving plate by clamping means corresponding to the location of a flange tip.

BRIEF DESCRIPTION OF THE DRAWINGS

The above and other objects and advantages of the invention will be apparent upon consideration of the following detailed description, taken in conjunction with the accompanying drawings, in which like reference numbers refer to like parts throughout, and in which.

DETAILED DESCRIPTION OF THE INVENTION

Figure 1:
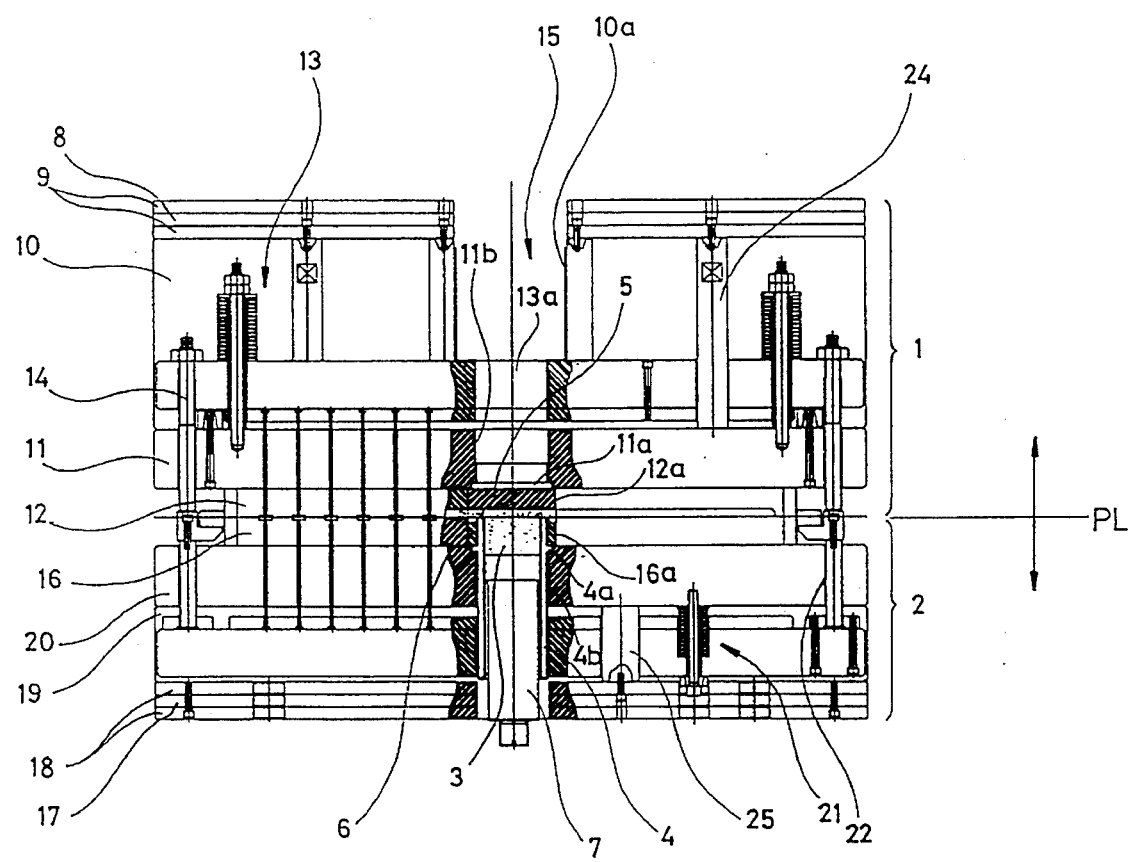
FIG. 1 is a longitudinal section view of an assembled mold for a semiconductor package which is arranged for cooperation with an upward type mold press.
Figure 2:
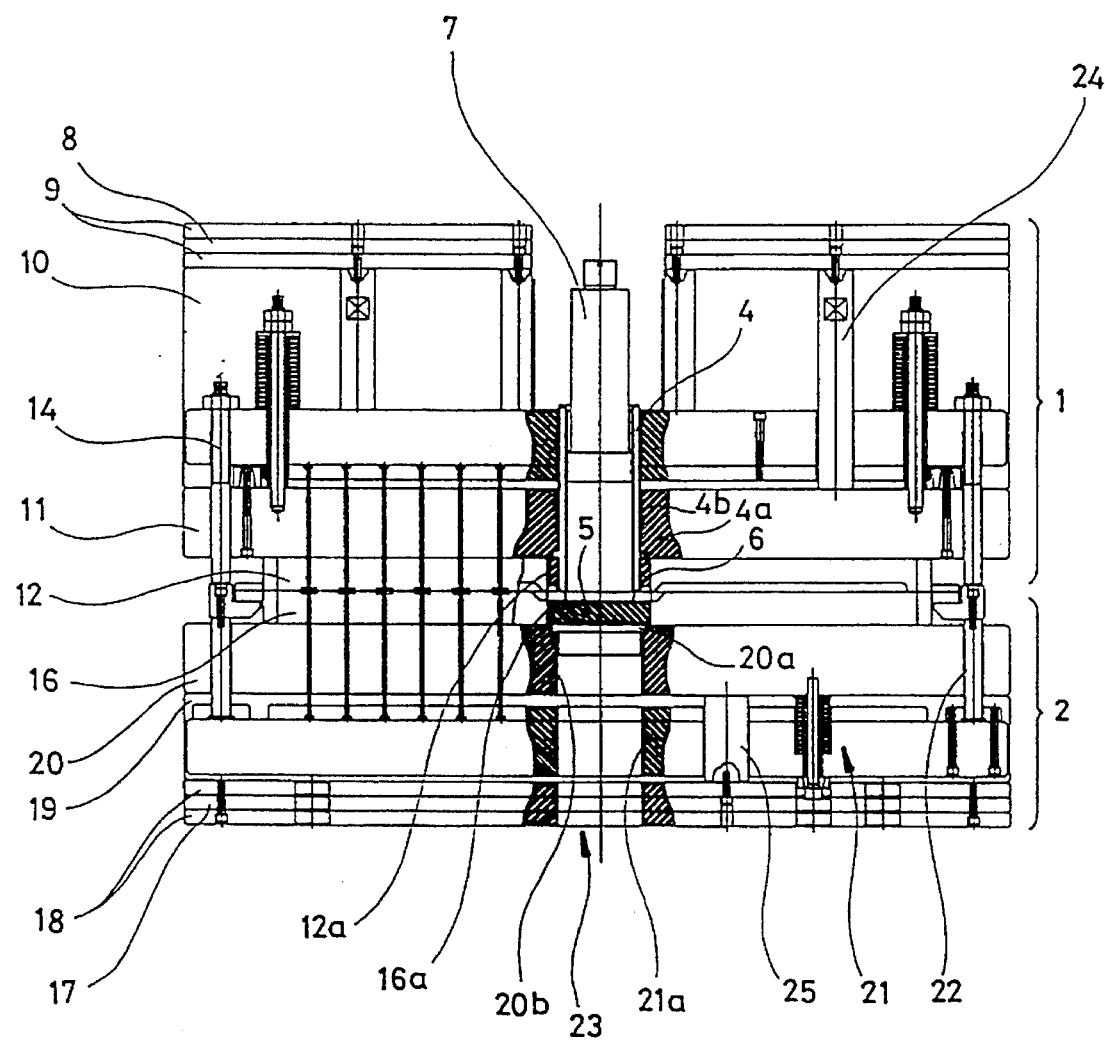
FIG. 2 is a longitudinal section view of an assembled mold, similar to the FIG. 1 excepts that it is arranged for operable with a downward type mold press.

Referring to the drawings, FIGS. 1 and 2 show a mold for a semiconductor package assembled in workable state corresponding to a flange tip type of a mold press.

The present invention comprises a port (4) for feeding resin (3), the upper center block (5) having a runner as a feeding passage for resin (3) and preventing a counter current of resin (3), and a port fixing block (6) which may be fixed either in the upper mold (1) secured in upper portion of the mold press (not shown) or the bottom mold (2) securely fixed in moving plate via clamping means corresponding to the location of the flange tip. In the upper mold (1), an adiabatic plate (8) is arranged between upper plates (9) fastened by clamping means such as bolts, wherein the adiabatic plate (8) insulates the heat of the upper mold (1) and permits reciprocating movement of the flange tip (7) operated by a hydraulic cylinder of the mold press. An upper mold base (11) is separated from the upper plates via the upper leg block (10) which has a feeding passage (10a) to provide resin to a downward type port (4).

Furthermore, an upper cavity block (12) is fixed below the upper mold base (11) to mold the upper portion of a semiconductor package, wherein the upper cavity block (12) is provided with upper ejecting means (13) to push a molded packaged therefrom, when lowered together with the bottom mold (2). Upper control means (14) are provided in the left and the right sides of the upper ejecting means (13) up to a desired location. The center portion of the upper cavity block (12) is a fitting section (15) for the downward type port (4).

A recess (12a) is provided in the center portion of the upper cavity block (12), into which either the upper center block (5) or the port fixing block (6) is assembled substantially vertically. A receiving groove (11a) and a hole (11b) are provided in the center of the upper mold base (11), i.e., the upper portion of the recess (12a), for receiving the flange (4a) of the port (4). A hole (13a) for receiving the periphery of the port (4) is formed toward the upper ejecting means (13).

The bottom mold comprises a bottom cavity block (16) which is closely contact with the upper cavity block (12), two bottom plates (18) fastened to the moving plate of the mold press, a bottom adiabatic plate (17) arranged between the bottom plates (18) and a bottom mold base (20) on which the bottom cavity block (16) is fixed. The bottom mold base (20) is spaced from the bottom plates via a bottom leg block (19), and a bottom ejecting means (21) having ejecting rods on both sides (not shown) to eject a semiconductor package filled in the bottom cavity block (16). Furthermore two bottom control means (22) are arranged in the left and the right sides of the bottom ejecting means (21). The lower center portion of the bottom cavity block (16) is used as a fitting portion (23) for the upward type port (4).

A recess (16a) is provided in the middle portion of the bottom cavity block (16) into which either the upper center block (5) or the port fixing block (6) is assembled substantially vertically. A groove (20a) and a hole (20b) are provided in the middle portion of the bottom mold base (20), i.e., the upper portion of the recess (12a), for receiving the flange (4a) and the peripheral surface (4b) of the port (4). A hole (13a) for receiving the peripheral surface of the port (4) is formed toward the bottom ejecting means (13).

The reference number 24 represents the upper supporting rod preventing the bending of the upper mold base (11) and 25 represents a bottom supporting rod for the bottom mold base (20).

The operational procedure of present mold to form a semiconductor package using the upward type mold press follows.

Figure 3:
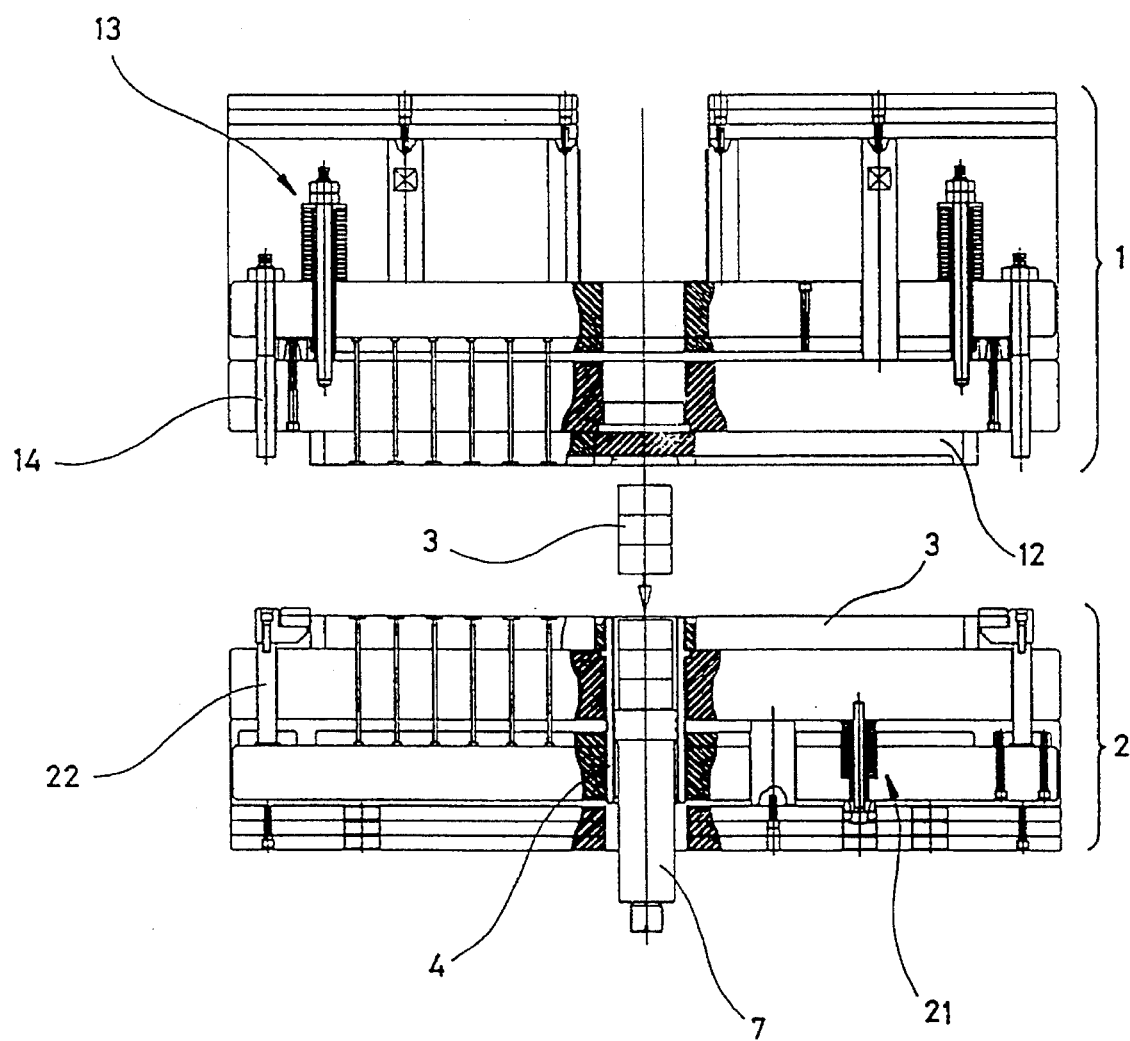
FIGS. 3 and 4(A)–4(C) illustrate the working state of the mold for a semiconductor package which is being used in the mold press arranged for cooperation with an upward type flange tip.
Figures 4A, 4B, 4C:
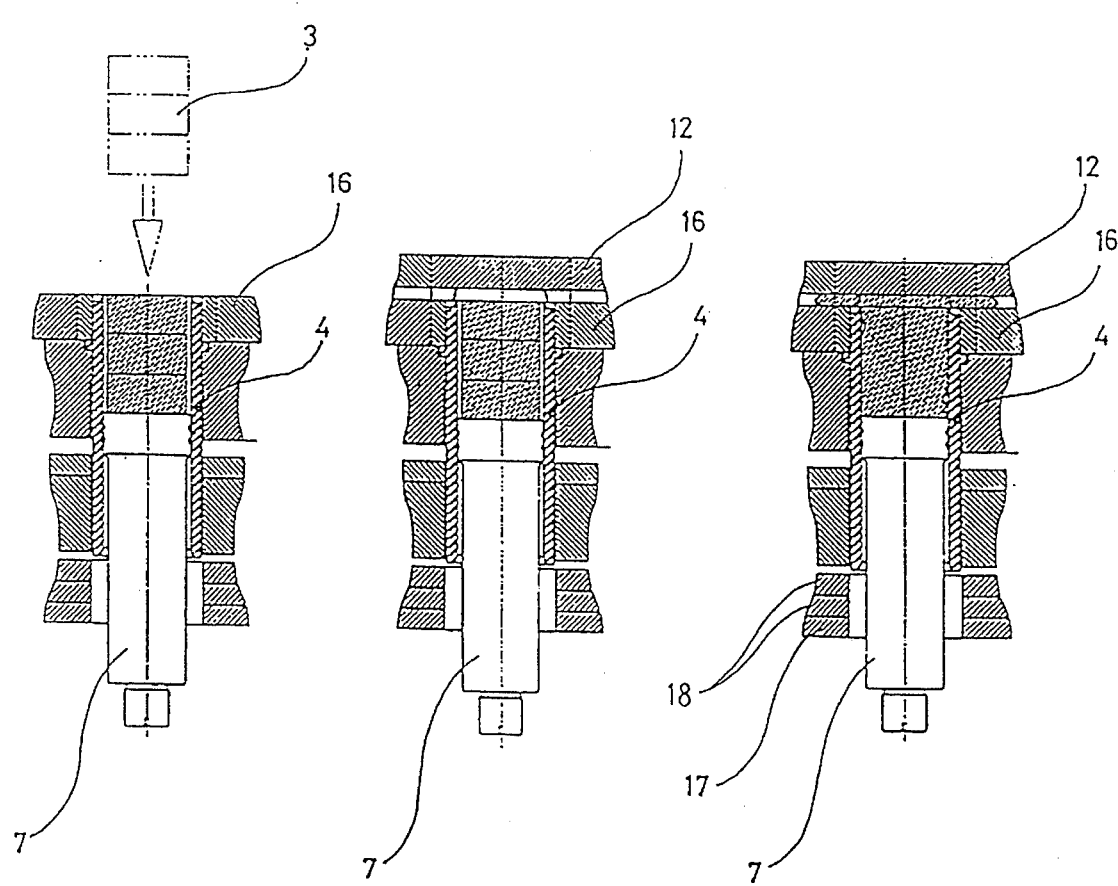

First the port (4) is assembled with the bottom mold (2) as shown in FIG. 3, and then driven so that resin (3) is fed into the port (4) while the bottom cavity block (16) of the bottom mold (2) fixed in the moving plate of the mold press is detached from the upper cavity block (12) of the upper mold (1) fixed in the upper portion of the mold press. Then as a lead frame is raised on the bottom cavity block (16) and the moving plate of the mold press is reascended to bring the upper cavity block (12) into contact with the bottom cavity block (16), the flange tip (7) reciprocating in the port may press the resin (3). Consequently, the resin (3) is respectively filled in cavities in turn via the runner as shown in the FIGS. 4(A), 4(B) and 4(C).

Figure 5:
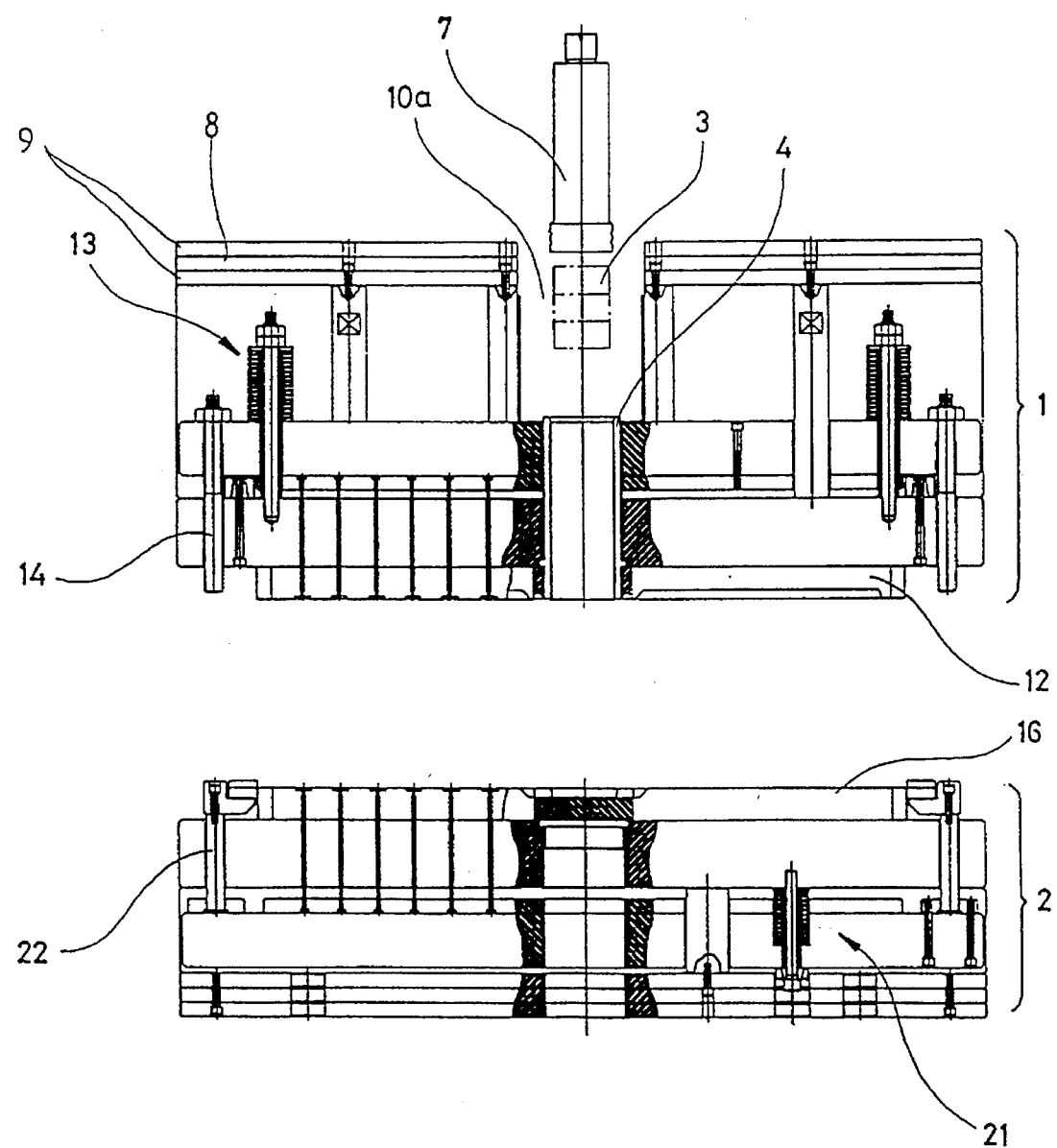
FIGS. 5 and 6(A)–6(C) illustrate the working state of the mold for a semiconductor package which is being used with a downward type mold press.

Alternatively, when the present mold is used in the downward type mold press, the port (4) is assembled in the upper mold (1) as shown in FIG. 5.

The operation of the mold in this situation follows.

Figures 6A, 6B, 6C:
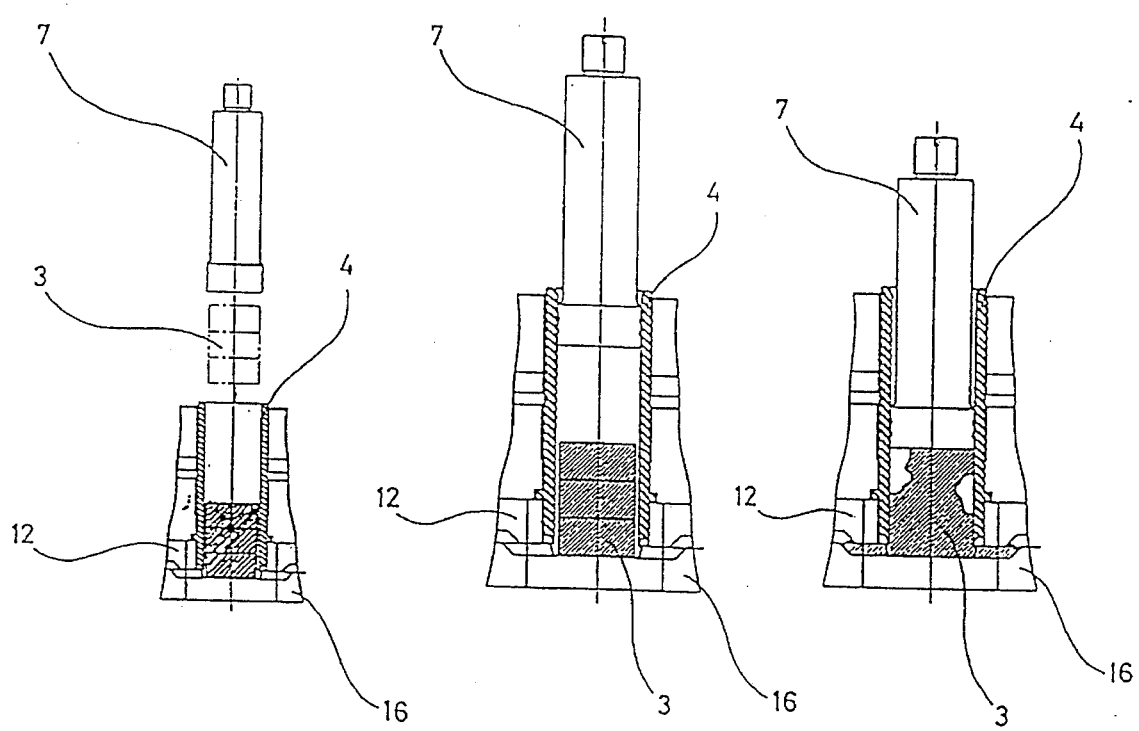
Figure 7:
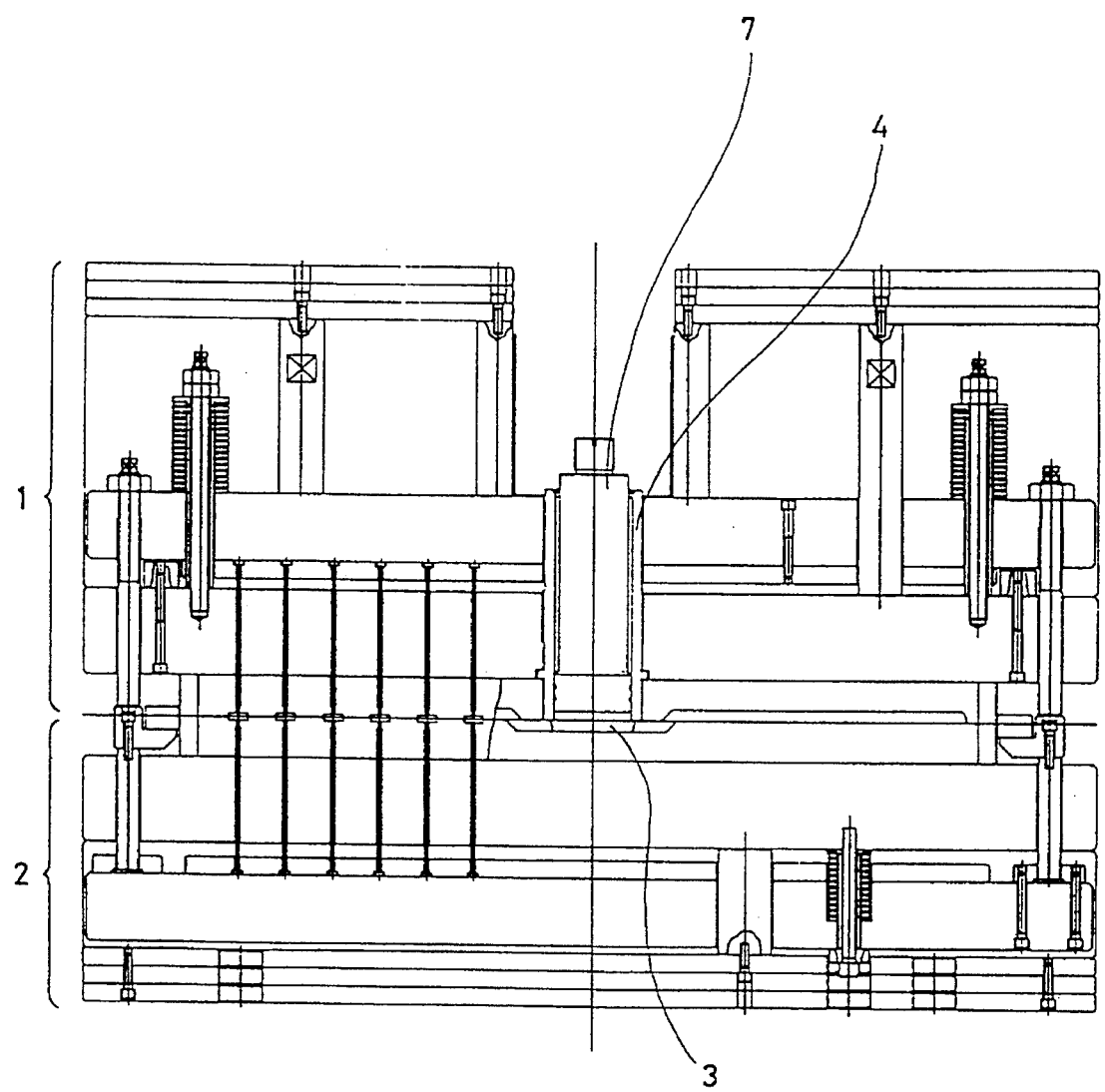
FIG. 7 is a section view of conventional mold for a semiconductor that is used with a downward type mold press.

The bottom cavity block (16) of the bottom mold (2) fixed in the moving plate of the mold press closely contacts the upper cavity block (12) of the upper mold (1) fixed in the upper portion of the mold press while the lead frame is raised on the bottom cavity block (16). Then as resin (3) is fed into the port (4) via the passage (10a) and compressed by the flange tip (7) that reciprocates in the port, the resin (3) is respectively filled in the cavities in turn via the runner to wrap around the lead frame as shown in the FIGS. 6(A), 6(B) and 6(C).

After a predetermined period of time in the foregoing situation, the moving plate of the mold fixed with the bottom mold (2) is lowered together with the upper ejecting means (13) to push the semiconductor package (12) from the upper cavity block (12). The upper control means (14) of the upper ejecting means (13) are supported by the bottom control means (22). Then as the semiconductor package engaged in the bottom cavity block (16) is lowered to a desired location, the hydraulic rod may push the ejecting rod arranged in the bottom ejecting means (21) and consequently, the bottom ejecting means are raised while ejecting the semiconductor package from the bottom cavity block.

According to the invention, since the port (4) for feeding resin (3), the upper center block (5) having the runner as the feeding passage for resin (3) and preventing a counter current of resin (3), and the port fixing block (6) may be fixed either in the upper mold (1) or in the bottom mold (2) securely fixed in the moving plate corresponding to the location of the flange tip, the operating rate of the equipment is increased to achieve high productivity.

I claim:

1. A mold for a semiconductor package comprising:

an upper mold mounted in an upper portion of a mold press, said upper mold forming an upper recess;

a lower mold mounted in a lower portion of the mold press, said lower mold forming a lower recess, said upper and lower molds forming at least one mold cavity therebetween;

a flange tip mounted to move in a port in one of the upper and lower molds;

a port fixing block configured to mount interchangeably in both the upper and lower recesses, said port fixing block mounted in the recess of said one of the molds in which the flange tip is mounted; and a center block having a runner as a feeding passage for resin and for preventing a counter current of resin, said center block configured to mount interchangeably in both the upper and lower recesses, said center block mounted in the recess of the other of the molds.

2. The mold of claim 1 wherein the upper mold comprises an upper cavity block, and wherein the lower mold comprises:

a lower cavity block positioned to contact the upper cavity block;

a pair of lower plates;

a lower adiabatic plate disposed between the lower plates;

a lower mold base interposed between the lower cavity block and the lower plates and spaced from the lower plates by a lower leg block;

a lower ejector comprising a plurality of ejector rods coupled to the lower cavity block to eject a semiconductor package from the lower cavity block; and control means arranged on opposed sides of the lower ejector to control an ejecting distance;

wherein the lower cavity block is configured to receive the port in an upwardly facing direction.

3. The mold of claim 2 wherein the lower cavity block and the lower mold base form the lower recess, wherein the lower recess comprises a groove for receiving a flange of the port, and wherein the lower recess comprises a hole in the lower mold base for receiving a peripheral surface of the port.

* * * * *